(12) United States Patent
Henderson

(10) Patent No.: US 10,830,477 B2
(45) Date of Patent: Nov. 10, 2020

(54) LOCKOUT DISPLAY METHOD FOR A PACKAGED TERMINAL AIR CONDITIONER UNIT

(71) Applicant: Haier US Appliance Solutions, Inc., Wilmington, DE (US)

(72) Inventor: Richard Dustin Henderson, LaGrange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 59 days.

(21) Appl. No.: 15/908,900

(22) Filed: Mar. 1, 2018

(65) Prior Publication Data
US 2019/0271482 A1 Sep. 5, 2019

(51) Int. Cl.
| | |
|---|---|
| *F24F 11/00* | (2018.01) |
| *F24F 11/52* | (2018.01) |
| *F24F 11/56* | (2018.01) |
| *G05B 19/042* | (2006.01) |
| *F24F 11/523* | (2018.01) |
| *F24F 1/027* | (2019.01) |

(52) U.S. Cl.
CPC ............ *F24F 11/52* (2018.01); *F24F 11/523* (2018.01); *F24F 11/56* (2018.01); *G05B 19/0425* (2013.01); *F24F 1/027* (2013.01); *G05B 2219/24167* (2013.01)

(58) Field of Classification Search
CPC .. F24F 1/027; F24F 1/031; F24F 11/50; F24F 11/52; F24F 11/523
See application file for complete search history.

(56) References Cited

U.S. PATENT DOCUMENTS

| | | | |
|---|---|---|---|
| 6,421,572 B1* | 7/2002 | Koyama | G05B 19/056 700/17 |
| 6,776,350 B2 | 8/2004 | Sumida et al. | |
| 8,035,063 B2 | 10/2011 | Shukla et al. | |
| 8,495,885 B2 | 7/2013 | Cooper et al. | |
| 9,535,408 B2* | 1/2017 | Lingrey | G05B 15/02 |
| 2001/0000664 A1* | 5/2001 | Armstrong | G04G 21/00 345/173 |
| 2006/0283965 A1* | 12/2006 | Mueller | G05B 19/042 236/51 |
| 2009/0158188 A1* | 6/2009 | Bray | G05D 23/1902 715/771 |
| 2016/0061501 A1* | 3/2016 | Billman | F24F 11/30 62/115 |
| 2017/0059198 A1* | 3/2017 | Roth | F24F 11/30 |

\* cited by examiner

*Primary Examiner* — Jonathan Bradford
(74) *Attorney, Agent, or Firm* — Dority & Manning, P.A.

(57) ABSTRACT

A method for operating a packaged terminal air conditioner includes scrolling through a sequence of characters on a display of the user interface in response to an input at a user interface of the packaged terminal air conditioner. The user interface is locked when the sequence of characters scrolls on the display of the user interface. The display of the user interface includes a pair of segment displays. Each segment display of the pair of segment displays includes no less than seven segments. The sequence of characters includes the letters L, O, and C.

8 Claims, 4 Drawing Sheets

LOCKOUT DISPLAY METHOD FOR A PACKAGED TERMINAL AIR CONDITIONER UNIT

FIELD OF THE INVENTION

The present subject matter relates generally to packaged terminal air conditioner units.

BACKGROUND OF THE INVENTION

Air conditioner units are conventionally utilized to adjust the temperature within structures such as dwellings and office buildings. In particular, one-unit type room air conditioner units may be utilized to adjust the temperature in, for example, a single room or group of rooms of a structure. Generally, one-unit type air conditioner units include an indoor portion and an outdoor portion. The indoor portion is generally located indoors, and the outdoor portion is generally located outdoors. Accordingly, the air conditioner unit generally extends through a wall, window, etc. of the structure.

To avoid unauthorized adjustment of one-unit type air conditioner units, the user interface may be locked. By design, it is not obvious how to unlock the user interface. Thus, if the one-unit type air conditioner unit is in a public area (e.g., a hallway, gym, etc.), only an authorized user of the one-unit type air conditioner units will know how to unlock the user interface.

Lockable user interfaces have drawbacks. Because locking the user interface is not obvious, the user interface may get unintentionally locked. In such as state, the authorized user may assume that the user interface is broken and arrange an unnecessary service call. Service technicians may even replace a functioning user interface by not recognizing that the user interface is only unintentionally locked.

BRIEF DESCRIPTION OF THE INVENTION

The present subject matter provides a method for operating a packaged terminal air conditioner that includes scrolling through a sequence of characters on a display of the user interface in response to an input at a user interface of the packaged terminal air conditioner. The user interface is locked when the sequence of characters scrolls on the display of the user interface. The display of the user interface includes a pair of segment displays. Each segment display of the pair of segment displays includes no less than seven segments. The sequence of characters includes the letters L, O, and C. Additional aspects and advantages of the invention will be set forth in part in the following description, or may be apparent from the description, or may be learned through practice of the invention.

In a first example embodiment, a method for operating a packaged terminal air conditioner includes operating a compressor of a sealed system of the packaged terminal air conditioner in order to transfer heat between an interior coil and an exterior coil of the sealed system, and, in response to an input at a user interface of the packaged terminal air conditioner, scrolling through a sequence of characters on a display of the user interface. The user interface is locked when the sequence of characters scrolls on the display of the user interface. The display of the user interface includes a pair of segment displays. Each segment display of the pair of segment displays includes no less than seven segments. The sequence of characters includes the letters L, O, and C.

In a second example embodiment, a packaged terminal air conditioner unit includes a sealed system that is positionable within a casing. The sealed system has a compressor, an interior coil and an exterior coil. The compressor is operable to increase a pressure of a refrigerant. A user interface has a display with a pair of segment displays. Each segment display of the pair of segment displays includes no less than seven segments. A controller in operative communication with the compressor and the user interface. The controller is configured for operating the compressor in order to transfer heat between the interior coil and the exterior coil and, in response to an input at the user interface, scrolling through a sequence of characters on the display of the user interface. The user interface is locked when the sequence of characters scrolls on the display of the user interface, and the sequence of characters includes the letters L, O, and C.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
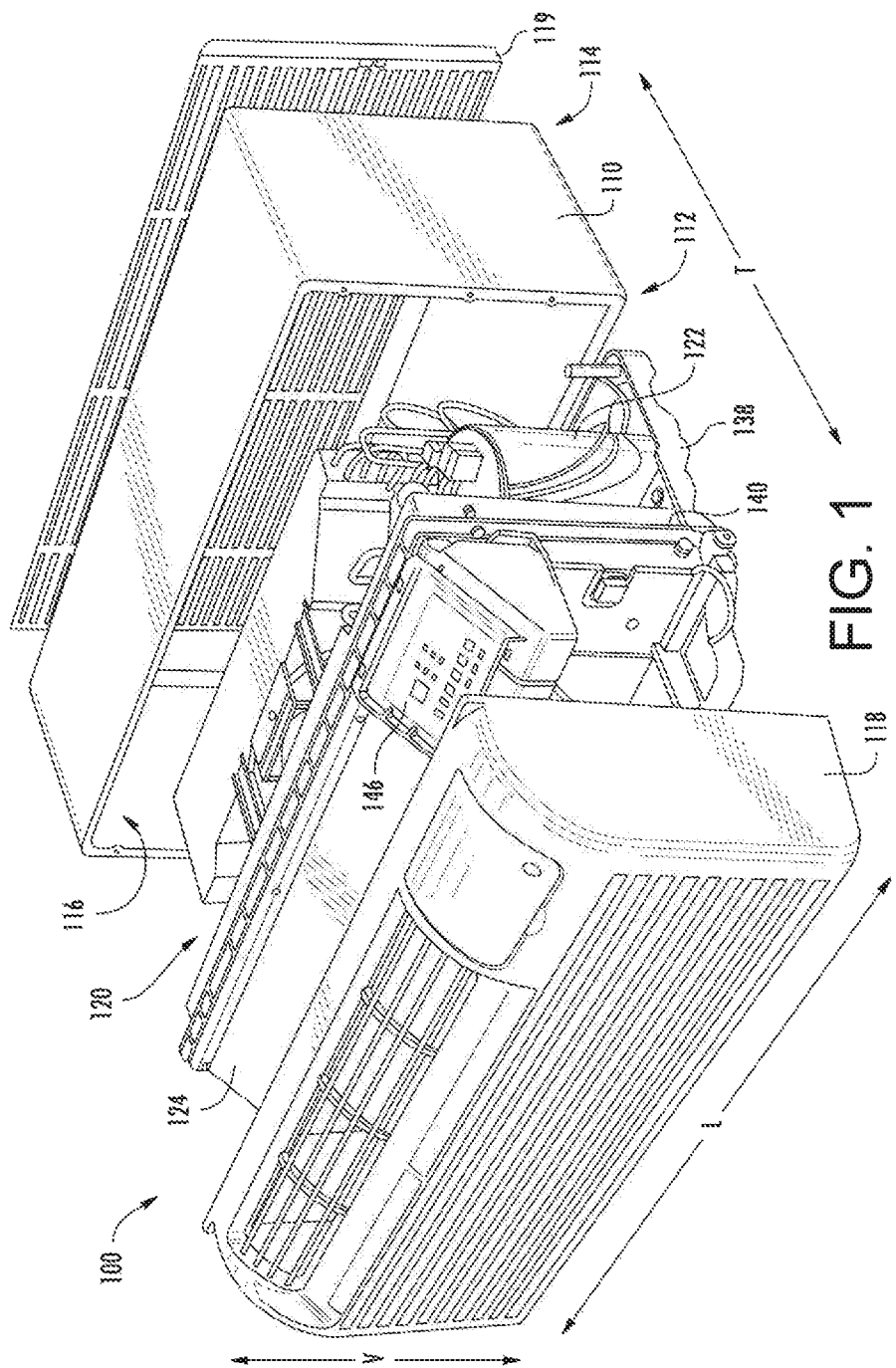
FIG. 1 is an exploded perspective view of a packaged terminal air conditioner unit according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides an exploded perspective view of a packaged terminal air conditioner unit 100 according to an example embodiment of the present subject matter. Packaged terminal air conditioner unit 100 is operable to generate chilled and/or heated air in order to regulate the temperature of an associated room or building. As will be understood by those skilled in the art, packaged terminal air conditioner unit 100 may be utilized in installations where split heat pump systems are inconvenient or impractical. As discussed in greater detail below, a sealed system 120 of packaged terminal air conditioner unit 100 is disposed within a casing 110. Thus, packaged terminal air conditioner unit 100 may be a self-contained or autonomous system for heating and/or cooling air. Packaged terminal air conditioner unit 100 defines a vertical direction V, a lateral direction L and a transverse direction T that are mutually perpendicular and form an orthogonal direction system.

As used herein, the term "packaged terminal air conditioner unit" is used broadly. For example, packaged terminal air conditioner unit 100 may include a supplementary electric heater (not shown) for assisting with heating air within the associated room or building without operating the sealed system 120. However, as discussed in greater detail below, packaged terminal air conditioner unit 100 may also include a heat pump heating mode that utilizes sealed system 120, e.g., in combination with an electric resistance heater, to heat air within the associated room or building. Thus, it should be understood that "packaged terminal air conditioner unit" as used herein is intended to cover both units with and without heat pump heating modes.

As may be seen in FIG. 1, casing 110 extends between an interior side portion 112 and an exterior side portion 114. Interior side portion 112 of casing 110 and exterior side portion 114 of casing 110 are spaced apart from each other. Thus, interior side portion 112 of casing 110 may be positioned at or contiguous with an interior atmosphere, and exterior side portion 114 of casing 110 may be positioned at or contiguous with an exterior atmosphere. Sealed system 120 includes components for transferring heat between the exterior atmosphere and the interior atmosphere, as discussed in greater detail below.

Casing 110 defines a mechanical compartment 116. Sealed system 120 is disposed or positioned within mechanical compartment 116 of casing 110. A front panel 118 and a rear grill or screen 119 hinder or limit access to mechanical compartment 116 of casing 110. Front panel 118 is positioned at or adjacent interior side portion 112 of casing 110, and rear screen 119 is mounted to casing 110 at exterior side portion 114 of casing 110. Front panel 118 and rear screen 119 each define a plurality of holes that permit air to flow through front panel 118 and rear screen 119, with the holes sized for preventing foreign objects from passing through front panel 118 and rear screen 119 into mechanical compartment 116 of casing 110.

Packaged terminal air conditioner unit 100 also includes a drain pan or bottom tray 138 and an inner wall or bulkhead 140 positioned within mechanical compartment 116 of casing 110. Sealed system 120 is positioned on bottom tray 138. Thus, liquid runoff from sealed system 120 may flow into and collect within bottom tray 138. Bulkhead 140 may be mounted to bottom tray 138 and extend upwardly from bottom tray 138 to a top wall of casing 110. Bulkhead 140 limits or prevents air flow between interior side portion 112 of casing 110 and exterior side portion 114 of casing 110 within mechanical compartment 116 of casing 110. Thus, bulkhead 140 may divide mechanical compartment 116 of casing 110.

Packaged terminal air conditioner unit 100 further includes a controller 146 with user inputs, such as buttons, switches and/or dials. Controller 146 regulates operation of packaged terminal air conditioner unit 100. Thus, controller 146 is in operative communication with various components of packaged terminal air conditioner unit 100, such as components of sealed system 120 and/or a temperature sensor, such as a thermistor or thermocouple, for measuring the temperature of the interior atmosphere. In particular, controller 146 may selectively activate sealed system 120 in order to chill or heat air within sealed system 120, e.g., in response to temperature measurements from the temperature sensor.

Controller 146 includes memory and one or more processing devices such as microprocessors, CPUs or the like, such as general or special purpose microprocessors operable to execute programming instructions or micro-control code associated with operation of packaged terminal air conditioner unit 100. The memory can represent random access memory such as DRAM, or read only memory such as ROM or FLASH. The processor executes programming instructions stored in the memory. The memory can be a separate component from the processor or can be included onboard within the processor. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
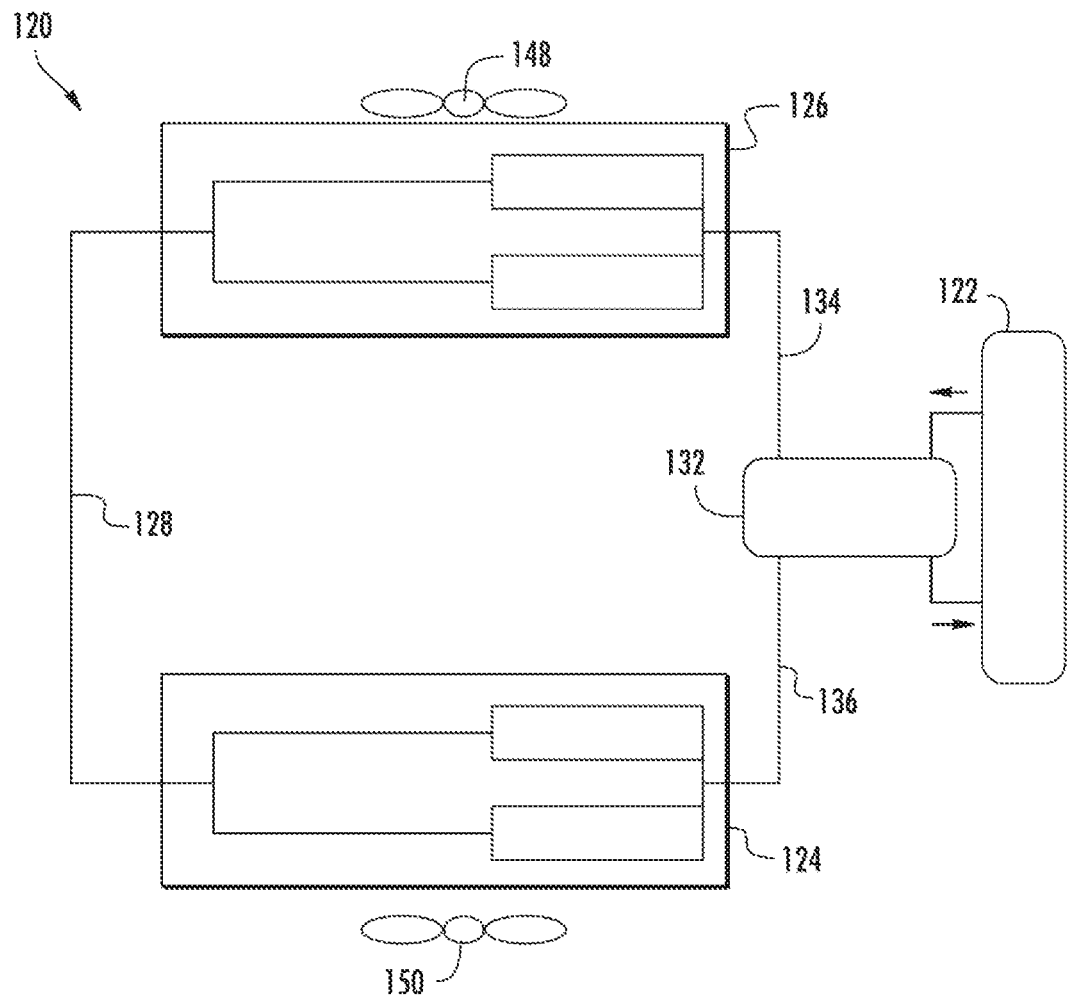
FIG. 2 is a schematic view of certain components of the example packaged terminal air conditioner unit of FIG. 1.

FIG. 2 provides a schematic view of certain components of packaged terminal air conditioner unit 100, including sealed system 120. Sealed system 120 generally operates in a heat pump cycle. Sealed system 120 includes a compressor 122, an interior heat exchanger or coil 124 and an exterior heat exchanger or coil 126. As is generally understood, various conduits may be utilized to flow refrigerant between the various components of sealed system 120. Thus, e.g., interior coil 124 and exterior coil 126 may be between and in fluid communication with each other and compressor 122.

As may be seen in FIG. 2, sealed system 120 may also include a reversing valve 132. Reversing valve 132 selectively directs compressed refrigerant from compressor 122 to either interior coil 124 or exterior coil 126. For example, in a cooling mode, reversing valve 132 is arranged or configured to direct compressed refrigerant from compressor 122 to exterior coil 126. Conversely, in a heating mode, reversing valve 132 is arranged or configured to direct compressed refrigerant from compressor 122 to interior coil 124. Thus, reversing valve 132 permits sealed system 120 to adjust between the heating mode and the cooling mode, as will be understood by those skilled in the art.

During operation of sealed system 120 in the cooling mode, refrigerant flows from interior coil 124 flows through compressor 122. For example, refrigerant may exit interior coil 124 as a fluid in the form of a superheated vapor. Upon exiting interior coil 124, the refrigerant may enter compressor 122. Compressor 122 is operable to compress the refrigerant. Accordingly, the pressure and temperature of the refrigerant may be increased in compressor 122 such that the refrigerant becomes a more superheated vapor.

Exterior coil 126 is disposed downstream of compressor 122 in the cooling mode and acts as a condenser. Thus, exterior coil 126 is operable to reject heat into the exterior atmosphere at exterior side portion 114 of casing 110 when sealed system 120 is operating in the cooling mode. For example, the superheated vapor from compressor 122 may enter exterior coil 126 via a first distribution conduit 134 that extends between and fluidly connects reversing valve 132 and exterior coil 126. Within exterior coil 126, the refrigerant from compressor 122 transfers energy to the exterior atmosphere and condenses into a saturated liquid and/or liquid vapor mixture. An exterior air handler or fan 148 is positioned adjacent exterior coil 126 may facilitate or urge a flow of air from the exterior atmosphere across exterior coil 126 in order to facilitate heat transfer.

Sealed system 120 also includes a capillary tube 128 disposed between interior coil 124 and exterior coil 126, e.g., such that capillary tube 128 extends between and fluidly couples interior coil 124 and exterior coil 126. Refrigerant, which may be in the form of high liquid quality/saturated liquid vapor mixture, may exit exterior coil 126 and travel through capillary tube 128 before flowing through interior coil 124. Capillary tube 128 may generally expand the refrigerant, lowering the pressure and temperature thereof. The refrigerant may then be flowed through interior coil 124.

Interior coil 124 is disposed downstream of capillary tube 128 in the cooling mode and acts as an evaporator. Thus, interior coil 124 is operable to heat refrigerant within interior coil 124 with energy from the interior atmosphere at interior side portion 112 of casing 110 when sealed system 120 is operating in the cooling mode. For example, the liquid or liquid vapor mixture refrigerant from capillary tube 128 may enter interior coil 124 via a second distribution conduit 136 that extends between and fluidly connects interior coil 124 and reversing valve 132. Within interior coil 124, the refrigerant from capillary tube 128 receives energy from the interior atmosphere and vaporizes into superheated vapor and/or high quality vapor mixture. An interior air handler or fan 150 is positioned adjacent interior coil 124 may facilitate or urge a flow of air from the interior atmosphere across interior coil 124 in order to facilitate heat transfer.

During operation of sealed system 120 in the heating mode, reversing valve 132 reverses the direction of refrigerant flow through sealed system 120. Thus, in the heating mode, interior coil 124 is disposed downstream of compressor 122 and acts as a condenser, e.g., such that interior coil 124 is operable to reject heat into the interior atmosphere at interior side portion 112 of casing 110. In addition, exterior coil 126 is disposed downstream of capillary tube 128 in the heating mode and acts as an evaporator, e.g., such that exterior coil 126 is operable to heat refrigerant within exterior coil 126 with energy from the exterior atmosphere at exterior side portion 114 of casing 110.

It should be understood that sealed system 120 described above is provided by way of example only. In alternative example embodiments, sealed system 120 may include any suitable components for heating and/or cooling air with a refrigerant. Similarly, sealed system 120 may have any suitable arrangement or configuration of components for heating and/or cooling air with a refrigerant in alternative example embodiments.

Figure 3:
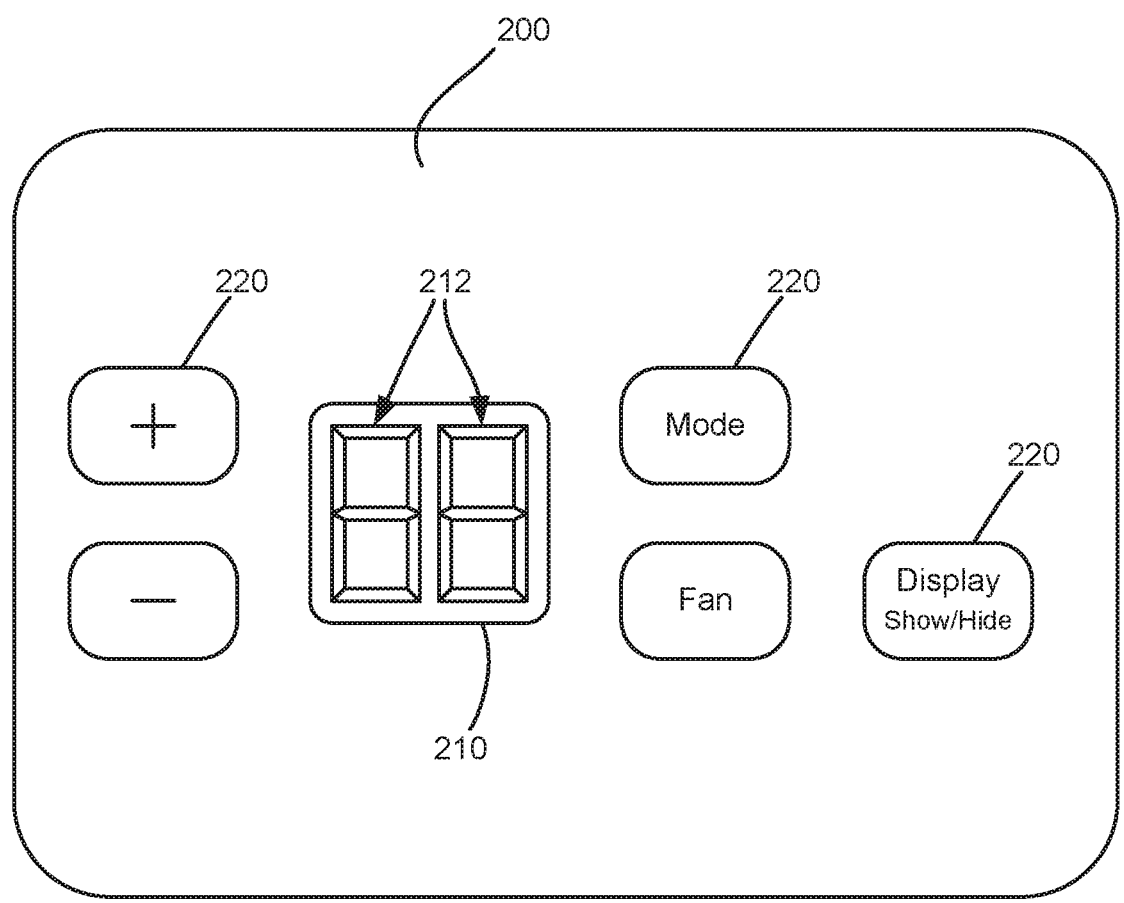
FIG. 3 is a front, elevation view of a user interface panel of the example packaged terminal air conditioner unit of FIG. 1.

FIG. 3 is a front, elevation view of a user interface panel 200 of packaged terminal air conditioner unit 100. User interface panel 200 is in operative communication with controller 146. Thus, e.g., a user may input commands at user interface panel 200, and controller 146 may adjust operation of sealed system 120 or other components of packaged terminal air conditioner unit 100 in response to command signals from user interface panel 200. User interface panel 200 may be a local user interface, e.g., such that user interface panel 200 is mounted to bulkhead 140 or some other component of packaged terminal air conditioner unit 100, and a user may utilize user interface panel 200 at or adjacent packaged terminal air conditioner unit 100 to adjust operation of packaged terminal air conditioner unit 100. In alternative example embodiments, user interface panel 200 may be a remote user interface, e.g., a wall mounted thermostat, and the user may utilize user interface panel 200 away from packaged terminal air conditioner unit 100 to adjust operation of packaged terminal air conditioner unit 100.

User interface panel 200 includes a display 210 and a plurality of input components 220. Input components 220 may be one or more of a variety of touch-type controls, electrical, mechanical or electro-mechanical input devices including knobs, rotary dials, push buttons, touch pads, etc. Display 210 is designed to provide visual feedback to a user of packaged terminal air conditioner unit 100.

Display 210 includes a pair of segment displays 212. Segment displays 212 may include no less than seven segments. For example, each segment display 212 may include exactly seven segments in certain example embodiments. Thus, segment displays 212 may be seven segment displays. In alternative example embodiments, segment displays 212 may be nine segment displays, fourteen segment displays, sixteen segment displays, etc. As shown in FIG. 3, segment displays 212 may include exactly two segment displays 212. Thus, e.g., display 210 may offer limited informational display states relative to other known displays, such as LCD screens, vacuum fluorescent displays, dot matrix displays, etc. As discussed in greater detail below, display 210 may be advantageously utilized to communicate when user interface panel 200 is in a locked state despite the limited informational display states provided by segment displays 212.

Figure 4:
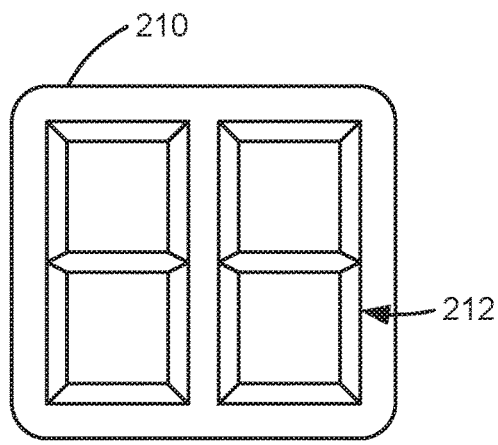
FIGS. 4 through 9 are front, elevation views of a display of the user interface panel of FIG. 3 in which segment displays are shown with various characters.
Figure 5:
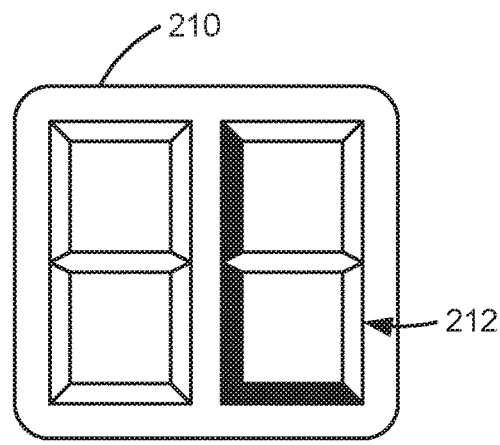
Figure 6:
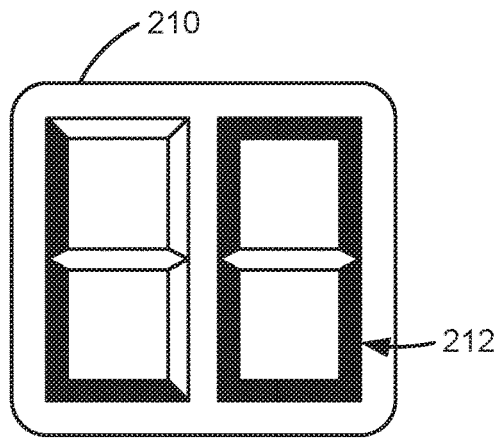

FIGS. 4 through 9 are front, elevation views of display 210 of user interface panel 200 in which segment displays 212 are shown with various characters. In particular, segment displays 212 are blank in FIGS. 4 and 9 such that no characters are presented on segment displays 212. In FIG. 5, one of segment displays 212 (e.g., a rightmost one of segment displays 212) presents the character "L" and the other of segment displays 212 (e.g., a leftmost one of segment displays 212) is blank and presents no character. In FIG. 6, the one of segment displays 212 presents the character "O" and the other of segment displays 212 presents the character "L." In FIG. 7, the one of segment displays 212 presents the character "C" and the other of segment displays 212 presents the character "O." In FIG. 8, the one of segment displays 212 is blank and presents no character and the other of segment displays 212 presents the character "C."

When user interface panel 200 is locked, controller 146 may not adjust operation of sealed system 120 or other components of packaged terminal air conditioner unit 100 in response to actuation of input components 220. User interface panel 200 may be locked by pressing the input component 220 labeled "Display Show/Hide" for ten seconds when user interface panel 200 is unlocked. Similarly, user interface panel 200 may be unlocked by pressing the input component 220 labeled "Display Show/Hide" for ten seconds when user interface panel 200 is locked. It will be understood that other suitable actuation of input components 220 may be utilized to lock/unlock user interface panel 200 in alternative example embodiments.

Packaged terminal air conditioner unit 100 utilizes segment displays 212 to communicate that user interface panel 200 is locked. In particular, a user may push one of input component 220 when user interface panel 200 is locked. However, the user may not know that user interface panel 200 is locked and may expect controller 146 to adjust operation of sealed system 120 or other components of packaged terminal air conditioner unit 100 in response to actuation of input components 220. Segment displays 212 communicate to the user that user interface panel 200 is locked, e.g., despite only having two segment displays 212.

Figure 7:
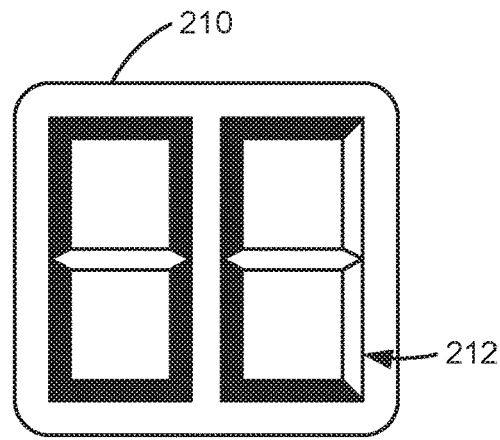
Figure 8:
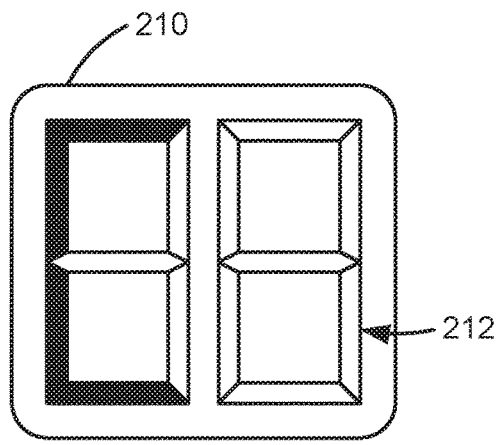
Figure 9:
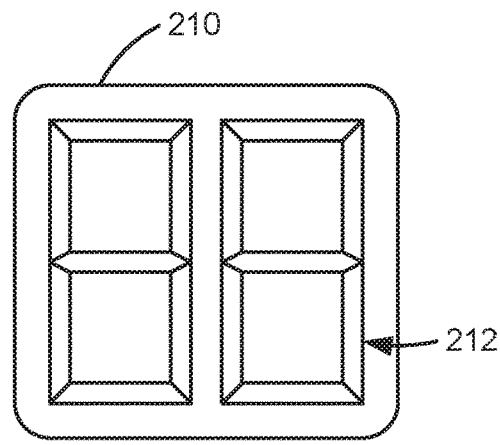

To provide such communication, display 210 may scroll through a sequence of characters in response to an input at user interface panel 200. For example, after a user presses one of input components 220, display 210 may scroll through the sequence of characters, and the sequence of characters may be selected to communicate that user interface panel 200 is locked. As shown in FIGS. 4 through 9, the sequence of characters may include the letters "L," "O," and "C" and such letters may be sequentially scrolled across display 210 on segment displays 212. In particular, display 210 may start with segment displays 212 blank as shown in FIG. 4. Display 210 may then shift segment displays 212 to present only the letter "L" as shown in FIG. 5. Subsequently, display 210 may shift segment displays 212 to present the letters "L" and "O" as shown in FIG. 6, then shift segment displays 212 to present the letters "O" and "C" as shown in FIG. 7, then shift segment displays 212 to present the letter "C" as shown in FIG. 8. Finally, display 210 may again adjust segment displays 212 to be blank as shown in FIG. 9. The sequence of characters shown in FIGS. 4 through 9 may be repeated one, two, three or more times.

By scrolling the letters "L," "O," and "C" on segment displays 212, display 210 may advantageously communicate to a user of packaged terminal air conditioner unit 100 that user interface panel 200 is locked, e.g., despite only having two segment displays 212.

After presenting the sequence of characters on segment displays 212, display 210 may also present a pair of numbers. The pair of numbers may correspond to a set temperature of sealed system 120. Thus, after communicating to the user of packaged terminal air conditioner unit 100 that user interface panel 200 is locked, display 210 may advantageously shift to presenting the set temperature of sealed system 120. As an example, a user of sealed system 120 may select the set temperature of sealed system 120 as seventy degrees Fahrenheit (70° F.) or some temperate setting. As may be seen from the above, when user interface panel 200 is locked and one of input component 220 is pressed, display 210 may scroll between "L," "O," "C," and the set temperature of sealed system 120 on segment displays 212. Thus, the user of sealed system 120 may also advantageously see the current set temperature of sealed system 120 such that the user of sealed system 120 is informed as to the room temperature that sealed system 120 is operating to achieve in addition to the fact that user interface panel 200 is locked.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating packaged terminal air conditioner, comprising:

operating a compressor of a sealed system of the packaged terminal air conditioner in order to transfer heat between an interior coil and an exterior coil of the sealed system; and in response to an input at a user interface of the packaged terminal air conditioner, scrolling through a sequence of characters on a display of the user interface, wherein the user interface is locked when the sequence of characters scrolls on the display of the user interface, wherein the display of the user interface comprises only two segment displays, and each segment display of the only two segment displays is a seven-segment display, and wherein the sequence of characters consists of the letters L, O, and C.

2. The method of claim 1, further comprising presenting a pair of numbers on the display of the user interface after scrolling through the sequence of characters.

3. The method of claim 2, wherein the pair of numbers corresponds to a set temperature of the sealed system.

4. The method of claim 2, further comprising repeating the sequence of characters on the display of the user interface after presenting the pair of numbers on the display of the user interface.

5. A packaged terminal air conditioner unit, comprising:
    a sealed system positionable within a casing, the sealed system having a compressor, an interior coil and an exterior coil, the compressor operable to increase a pressure of a refrigerant;
    a user interface having a display with only two segment displays, each segment display of the only two segment displays being a seven-segment display;
    a controller in operative communication with the compressor and the user interface, the controller configured for
        operating the compressor in order to transfer heat between the interior coil and the exterior coil; and
        in response to an input at the user interface, scrolling through a sequence of characters on the display of the user interface at least twice,
        wherein the user interface is locked when the sequence of characters scrolls on the display of the user interface, and
        wherein the sequence of characters consists of the letters L, O, and C.

6. The packaged terminal air conditioner unit of claim 5, wherein the controller is further configured for presenting a pair of numbers on the display of the user interface after scrolling through the sequence of characters.

7. The packaged terminal air conditioner unit of claim 6, wherein the pair of numbers corresponds to a set temperature of the sealed system.

8. The packaged terminal air conditioner unit of claim 6, wherein the controller is further configured for repeating the sequence of characters on the display of the user interface after presenting the pair of numbers on the display of the user interface.

* * * * *